July 25, 1944.　　　　C. F. FREDE　　　　2,354,309
RAILWAY TRUCK STRUCTURE
Filed Jan. 18, 1940　　　　5 Sheets-Sheet 1

INVENTOR
CHARLES F. FREDE
BY
Rodney Bedell
ATTORNEY

July 25, 1944.  C. F. FREDE  2,354,309
RAILWAY TRUCK STRUCTURE
Filed Jan. 18, 1940  5 Sheets-Sheet 2

INVENTOR
CHARLES F. FREDE
BY
Rodney Bedell
ATTORNEY

INVENTOR
CHARLES F. FREDE
BY
Rodney Bedell
ATTORNEY

July 25, 1944.　　　C. F. FREDE　　　2,354,309
RAILWAY TRUCK STRUCTURE
Filed Jan. 18, 1940　　　5 Sheets-Sheet 5

INVENTOR
CHARLES F. FREDE
BY
*Rodney Bedell*
ATTORNEY

Patented July 25, 1944

2,354,309

UNITED STATES PATENT OFFICE 2,354,309

RAILWAY TRUCK STRUCTURE

Charles F. Frede, University City, Mo., assignor to General Steel Castings Corporation, Granite City, Ill., a corporation of Delaware Application January 18, 1940, Serial No. 314,368

13 Claims. (Cl. 188—153)

The invention relates to railway rolling stock and more particularly to truck structure including equalizers between the axle journal boxes and brake gear mounted thereon.

Trucks used in railway passenger and high-speed freight service usually are of heavy construction, and the conventional braking mechanisms are also heavy and tend, when the brakes are applied, to tilt the truck frame and to produce vibrations transmitted through the frame to the car body. Conventional mechanical brake gear suspended from the truck frame tends to apply undesirable vertical forces to the truck springs and to the wheels.

The main object of the present invention is to provide a flexible, light-weight truck adapted for passenger and high-speed freight service and utilizing relatively light-weight braking structure.

Another object is to limit the reactions resulting from the applications of the brakes to circumferential reactions about the journals and to avoid the transfer of undesirable forces into the truck frame, and to avoid the effect of increasing the vertical loading on the wheels.

Another object is to have the brake-heads, and shoes, and preferably associated parts, move vertically with the wheels, relative to the frame, and independently of movements of the truck frame and bolster relative to the wheels.

A more detailed object is to mount the brake power operating means on the journal boxes or equalizers.

Another object is to provide an individual brake gear for each wheel, and thereby eliminate a number of parts which would be used frequently, such as brake beams, pull rods, unnecessarily heavy levers, etc., which transfer brake force from one end of the truck to the other.

Another object is to lighten the truck by combining the equalizers and journal boxes, eliminating the journal box pedestals on the frame and shortening the frame side members.

These and other detail objects as will appear hereafter are attained in the structures illustrated in the accompanying drawings in which—

Figure 1:
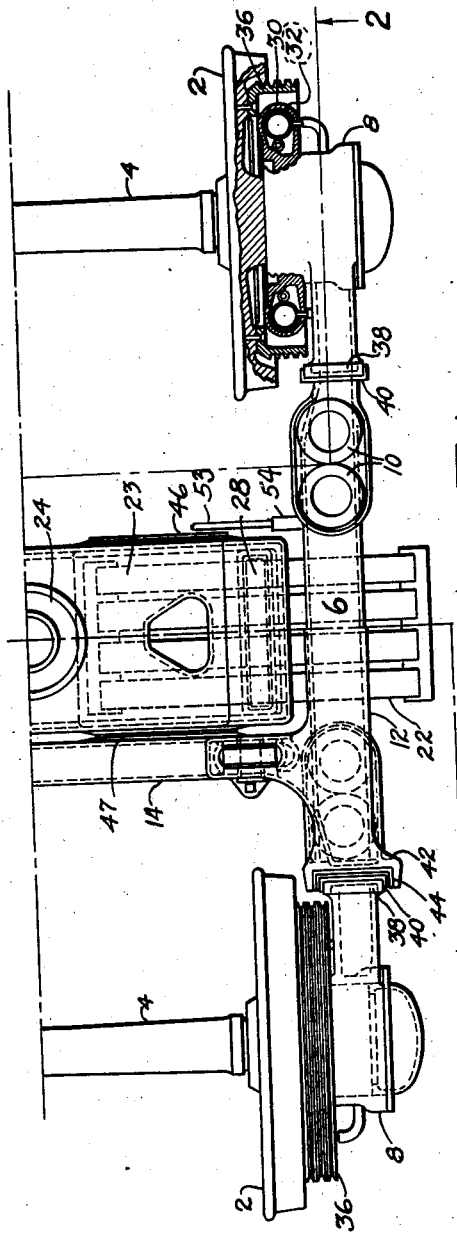
Figure 1 is a top view of one longitudinal half of a four wheel truck, a portion of one wheel and its brake structure, being sectioned horizontally.
Figure 2:
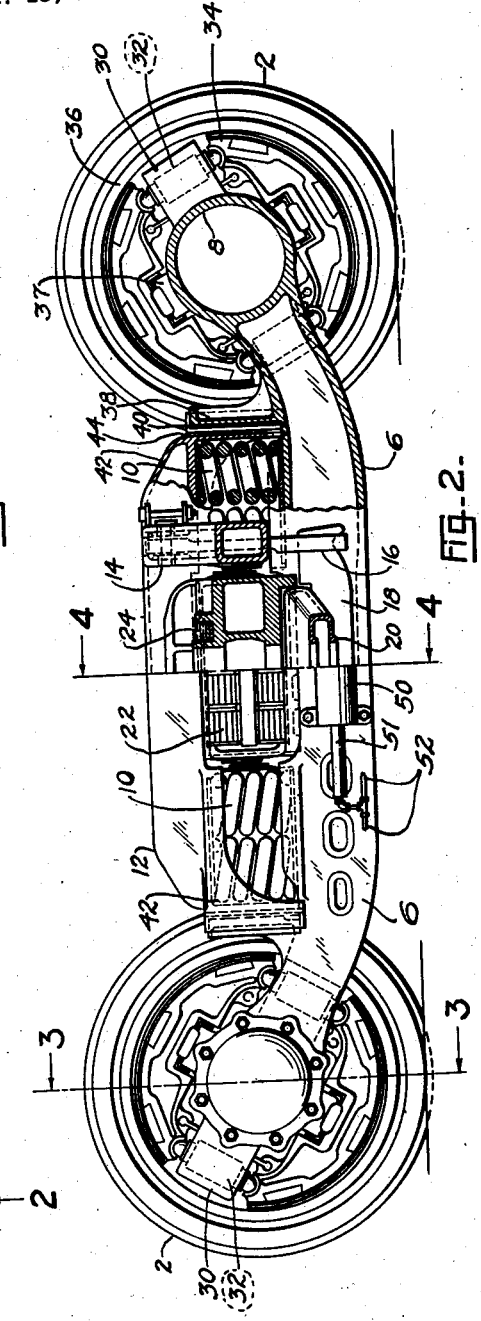
Figure 2 is in part a side elevation and in part a longitudinal vertical section and is taken on line 2—2 of Figure 1.
Figure 3:
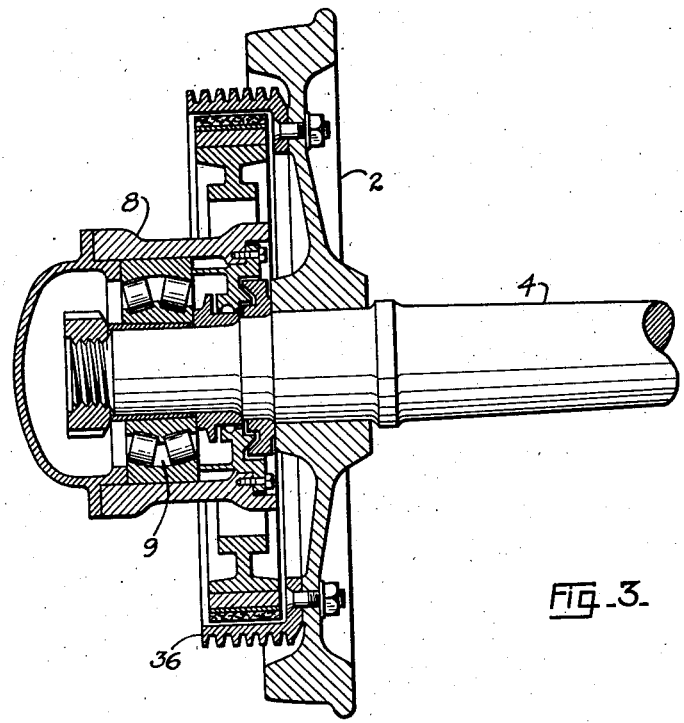
Figures 3 and 4 are vertical transverse sections taken on the corresponding section lines of Figure 2.
Figure 4:
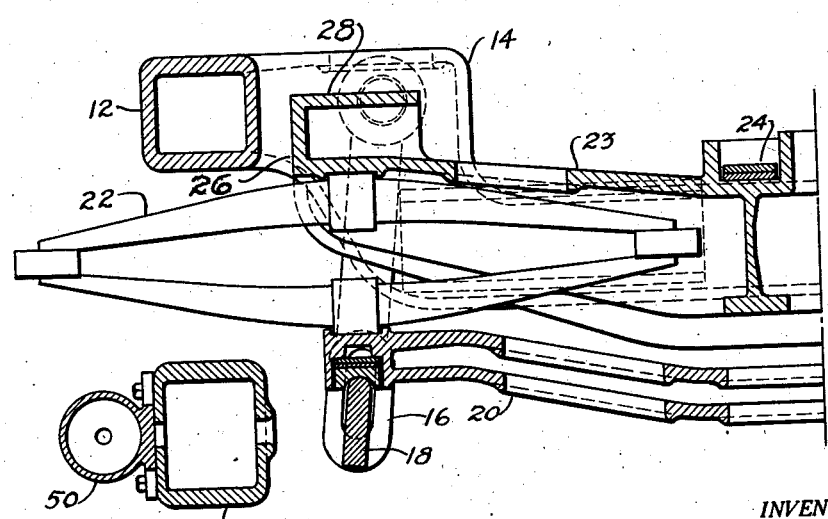

The truck illustrated in Figures 1 to 4 includes wheels 2, axles 4, and depressed equalizers 6 extending between and carried on the axle journals by integrally formed boxes 8 equipped with roller bearing units 9. Coil springs 10, seated on equalizers 6, support the side members 12 of a truck frame which includes transverse transoms 14 preferably formed integral with side members 12 and depressed between the side members to clear the vehicle body underframe (not shown). Suspended from the end portions of transoms 14 are swing hangers 16. The lower ends of each pair of hangers being connected by a cross-bar 18 and a spring plank 20 extending between and being supported by cross-bars 18 at opposite sides of the truck. Elliptic springs 22 are seated upon spring plank 20 and mount the truck bolster 23 which comprises a central portion having a center plate 24, and end portions 26 resting on springs 22 and provided with brackets 28 forming or carrying the truck side bearings.

Each journal box 8 includes a pair of chambers 30 each having an individual hydraulic expanding brake power unit 32 that thrusts the brake shoes 34 against the drum 36 rigid with the wheel. Lugs 37 on each journal box 6 interengage brake shoes 34 to position and guide the shoes towards and away from the brake drum and to prevent the shoes from rotating with the drum.

Each equalizer 6 is provided with a pair of upstanding brackets 38 spaced from journal boxes 8. Each bracket 38 is a channel section and is provided with a channel shaped liner or wear plate 40. Each frame side member 12 is provided with a pair of depending arms 42 receiving the upper end of springs 10 and having terminals nested in equalizer brackets 38 and provided with wear plates 44 opposing the equalizer bracket wear plates 40. This arrangement positions the truck frame longitudinally and transversely of the equalizers but accommodates relative vertical movement of the truck frame and equalizers due to the action of springs 10.

The bolster moves laterally and vertically of the frame and equalizers due to the action of the swing hangers 16 and elliptic springs 22. The lateral movement of the bolster is limited by the contact of its ends with the frame side members and movement of the bolster longitudinally of the frame is limited by the contact of chafing plates 46 on the bolster with chafing plates 47 on transoms 14.

Preferably all of the individual brake gear arrangements on the truck are operated by a single master cylinder 50 mounted on one of the equalizers 6 and having conduits 51, 52, 53 and 54 leading to the individual brake gear. Conduits 51 and 52 may be of rigid construction and fixedly secured to equalizer 6 which mounts the master cylinder. Cross-conduit 53 may be affixed to the frame transom with its ends connected to conduits 52 by flexible tubes 54.

Master cylinder 50 receives compressed air through conduit 52—53 from a reservoir (not shown) on the vehicle body and through its pistons and associated parts applies pressure through hydraulic fluid to units 32. The construction of the master cylinder 50 and the individual brake operating power units 32 forms the subject matter of a separate application, Serial No. 314,432 filed January 18, 1940, by the present applicant and Emil J. Schleicher and now Patent #2,319,950, May 25, 1943.

Figure 5:
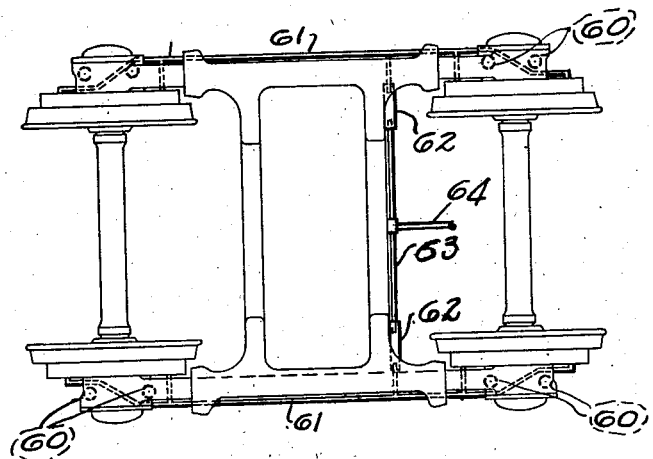
Figure 5 is a top diagrammatic view illustrating the operation of all the individual brake gears on a truck by a single source of air supply.

Figure 5 illustrates a form of the invention which omits the master pneumatic-hydraulic cylinder common to all of the individual brake gears on the truck as described above, and each individual brake operating power unit 60 comprises a quick-acting combined pneumatic and hydraulic cylinder and piston structure also disclosed in the above mentioned Frede and Schleicher application. All of these units 60 will be connected by conduits 61, tubes 62 and conduits 63 to a supply line 64 leading from an air reservoir (not shown), preferably mounted on the vehicle underframe.

Figure 6:
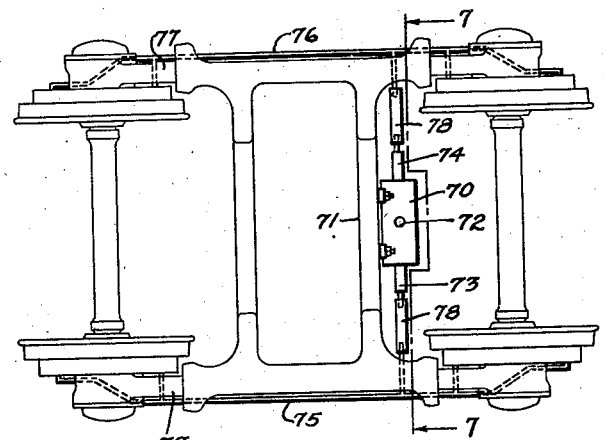
Figure 6 is a top diagrammatic view illustrating another arrangement of individual brake gears actuated by a single master cylinder mounted on the truck frame.
Figure 7:
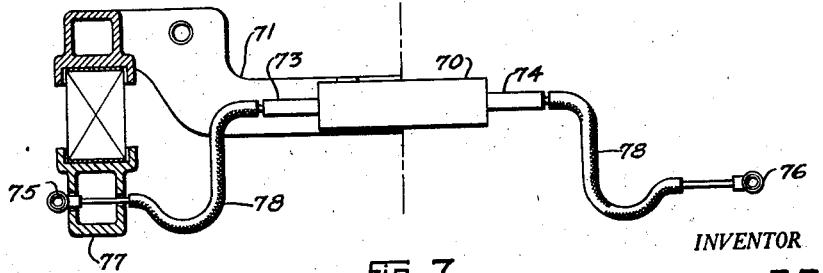
Figure 7 is a vertical section taken on a line 7—7 of Figure 6.
Figure 8:
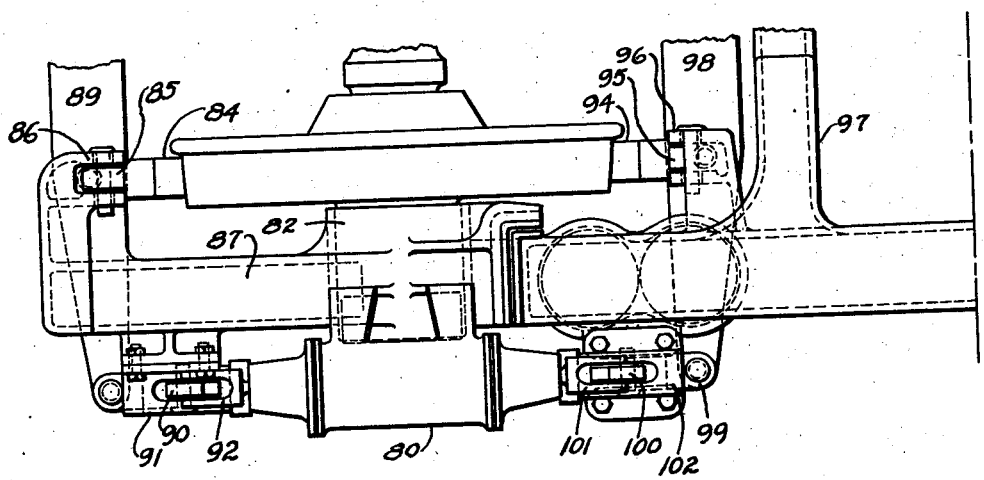
Figure 8 is a top view of one quarter of a truck embodying another form of the invention.
Figure 9:
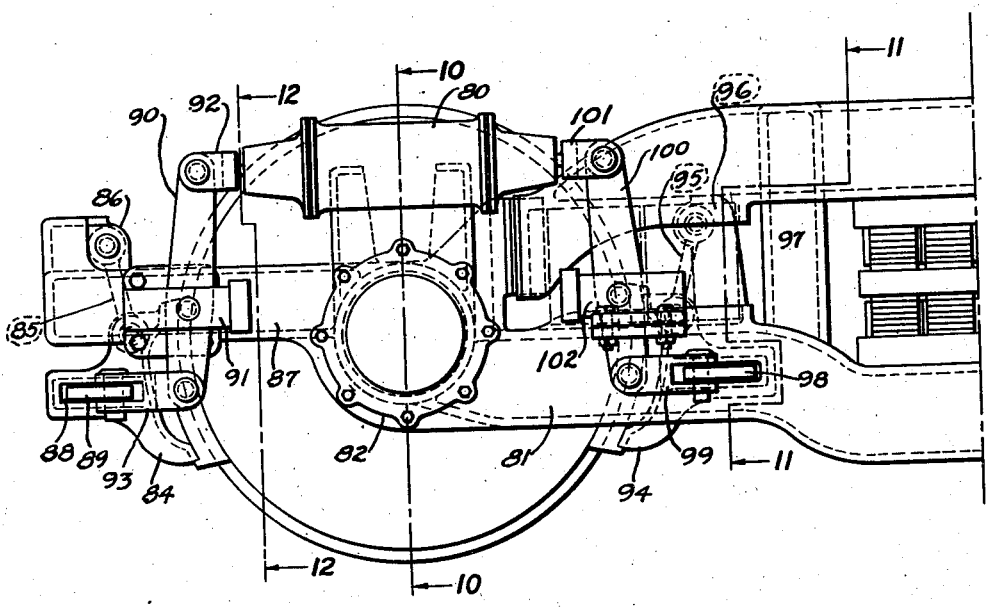
Figure 9 is a side elevation of the structure shown in Figure 8.
Figure 10:
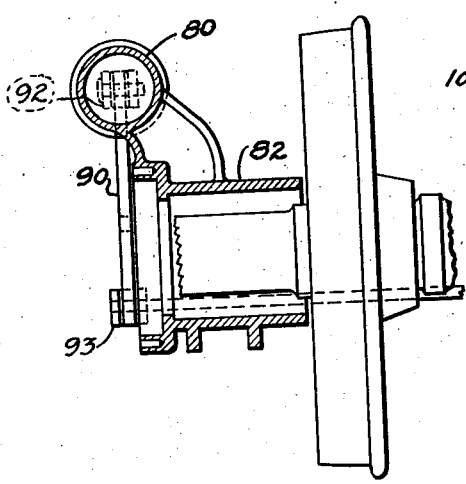
Figures 10, 11 and 12 are vertical transverse sections taken on corresponding section lines of Figure 9.
Figure 11:
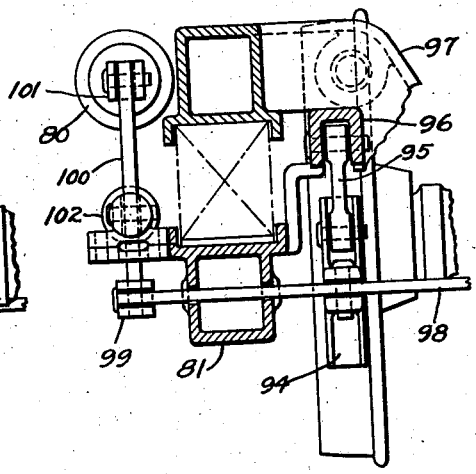
Figure 12:
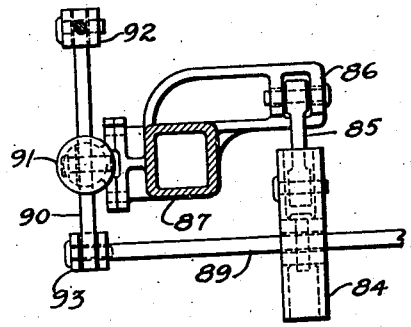

Figures 6 and 7 illustrate a form of the invention in which a master cylinder 70, similar to cylinder 50 in Figures 1–4, is mounted on a truck frame transom member 71 and receives compressed air through an inlet 72 and, with its piston and associated parts, forces hydraulic braking fluid through outlets 73 and 74 to conduits 75 and 76, carried on the truck equalizer 77 like the conduits previously described. Flexible tubes 78 connect the cylinder outlets 73 and 74 to the side conduits 75 and 76.

In the forms of the invention illustrated in Figures 1 to 7 the transverse conduits or tubing may extend through the equalizers as most clearly shown in Figure 7, or may be carried above or below the same as may be expedient.

Figures 8 to 12 illustrate another form of the invention in which a double acting cylinder and piston assembly 80 (operated preferably by compressed air only) is carried by a bracket extending upwardly from each journal box 82. A bracket 87 extends from each journal box towards the end of the truck and terminates in brake hanger jaws 88. Brake heads 84 are slotted transversely at 88 to receive the ends of brake beams 89, which extend transversely of the truck beyond the brake heads into the same general vertical plane as cylinders 80.

Brake levers 90 are pivoted to jaws 91 on brackets 87 and the upper end of each lever is pivoted to the corresponding piston rod 92 and the lower end of each lever is connected by a clevis 93 to the adjacent end of the brake beam.

Brake heads 94 are suspended by links 95 from jaws 96 on equalizers 81 and the latter are slotted transversely to receive brake beam 98 the outer ends of which are connected by clevises 99 to the lower ends of brake levers 100 pivoted on equalizer jaws 102 and having their upper ends actuated by piston rod 101.

The brake cylinder is shown as being cast integrally with the equalizer and the journal box, but it will be understood that these parts may be formed separately and bolted together. Similarly, jaws 91 and 102 may be formed integrally with bracket 87 and equalizer 81 instead of comprising separate parts bolted to the bracket and equalizer.

In all forms of the invention the provision of the equalizers and journal boxes as units and the mounting of the truck frames with relatively short side members terminating at points spaced from the journal boxes lightens the truck structure and affords room for the brake structures, whether of the expanding shoe internal drum type shown in Figures 1–7, or of the external clasp brake type shown in Figures 8–12. Shifting of the truck frame vertically relative to the wheels does not vary the braking forces as in the usual construction. All or a substantial part of the vibrations due to chatter between the brake parts and wheels are absorbed before being transmitted to the truck frame and the vehicle body.

The constructions illustrated attain the objects set forth in the introductory portion of the specification, but the structures may be varied substantially by those skilled in the art without departing from the spirit of the invention and the exclusive use of such modifications as come within the scope of the claims is contemplated.

What is claimed is:

1. In a railway truck, axles, wheels, journal boxes thereon, equalizers on said journal boxes, air brake cylinders and pistons carried by said journal boxes, brake levers fulcrumed on said equalizers, and brake elements carried by said levers and applied to said wheels by said cylinders and pistons.

2. In a railway truck, axles, wheels and journal boxes thereon, equalizers extending between journal boxes on the same side of the truck, brake beams carried by said equalizers, and power means carried by said journal boxes and operatively connected to said beams.

3. In a railway truck, axles having journals, wheels, structure including journal boxes and an equalizer member extending between journals on the same side of the truck, said structure being apertured transversely of the truck, brake beams extending through said apertures, and power means mounted on said journal boxes and operatively connected to said brake beams.

4. In a railway truck, axles, wheels and journal boxes thereon, equalizers between said journal boxes, a truck frame, spring supported on said equalizers, links pivotally suspended from said equalizers, brake elements carried by said links, and air cylinder and piston units rigid with said equalizers and operatively connected to said brake elements.

5. In a railway truck, wheels, axles thereon, journal boxes on said axles, members carried directly by said journal boxes and movable vertically therewith, brake elements movable with said boxes and members, and means for actuating said brake elements comprising individual combined cylinder and piston units on said boxes, and a source of fluid motive power for said units carried by one of said members between said boxes.

6. In a railway truck, spaced axles, wheels thereon, rigid journal box and equalizer structure carried on and extending between and beyond axles at the same side of the truck, brake gear for each wheel including elements having a stationary mounting on the corresponding structure at opposite sides of the axle and also including individual power means having a stationary mounting on the structure.

7. In a railway truck, axles having journals, wheels, structure including journal boxes and an equalizer member extending between and beyond journals on the same side of the truck, a truck frame, springs supported on said structure interposed between said structure and frame, brake gear mounted on said structure independently of said truck frame and including elements carried by said structure at opposite sides of said journals and also including air cylinder and piston units operatively connected to said elements.

8. In a railway truck, spaced axles, wheels thereon, journal box and equalizer structures carried on and extending between adjacent axles outwardly of the wheels, a load-carrying frame yieldingly supported on said structures, and brake gear for each wheel comprising spaced pressure elements at opposite sides of the corresponding axle and applicable to the wheel, and power mechanism between said elements for thrusting them in opposite directions transversely of the axle, said elements and mechanism being mounted on the associated journal box and equalizer structures independently of said frame, and being accessible while said structure, wheels and frame are assembled.

9. A construction as described in claim 8 in which the power mechanism comprises cylinder and piston means operatively associated with the pressure elements and operable to apply the pressure elements to the wheel independently of relative movement of the frame and equalizer.

10. A construction as described in claim 8 in which there is an annular drum on the side of the wheel and surrounding and cooperating with the brake gear pressure elements.

11. In a railway truck, an axle including a journal, a wheel mounted on said axle and having an annular drum comprising a brake pressure receiving element, brake friction members at opposite sides of the axle for engagement with said element, and a power means between said members for thrusting the same in opposite directions transversely of the axle and against said element, a load carrying frame, and an equalizer supporting the same from the wheel and axle but clearing said drum and friction members and mounting said power means.

12. In a railway truck, axles having journals, wheels, rigid structure including spaced journal boxes and an equalizer member extending between them, a brake gear for each wheel carried by said structure and including fluid cylinder units at opposite sides of the axle and rigid with the structure, pistons therein, and brake shoes at opposite sides of the axle both movable transversely of the axle by both of said pistons and applicable to the associated wheel, said brake gear being accessible from the side of the truck while the wheels and said structure are assembled.

13. In a railway truck, spaced axles with wheels, structure comprising journal boxes on the axles and equalizers extending between the journal boxes at the same side of the truck, a load carrying frame yieldingly supported upon the equalizers, the equalizers merging with the journal boxes and the frame terminating at points spaced from the journal boxes so that the major portion of the outer face of each wheel is unobstructed by the equalizer and frame, brake mechanisms carried by the equalizer and journal box structure and including friction elements applicable to cooperating elements on the unobstructed portions of the wheels.

CHARLES F. FREDE.